United States Patent Office 3,462,409
Patented Aug. 19, 1969

3,462,409
PYRAZOLONE CONTAINING DISAZO DYESTUFFS AND THEIR METAL COMPLEXES
Fritz Meininger, Frankfurt am Main, Germany, assignor to Farbwerke Hoechst Aktiengesellschaft vormals Meister Lucius & Bruning, Frankfurt am Main, Germany, a corporation of Germany
No Drawing. Filed Aug. 24, 1966, Ser. No. 574,568
Claims priority, application Germany, Aug. 28, 1965, F 47,032; Jan. 7, 1966, F 48,112
Int. Cl. C09b *45/26, 45/28, 45/30*
U.S. Cl. 260—147                              7 Claims

ABSTRACT OF THE DISCLOSURE

Fibre-reactive disazo-dyestuffs and the metal complex compounds thereof containing as reactive grouping one or two groupings of the formulae

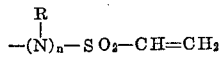

and

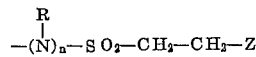

wherein R represents hydrogen or lower alkyl, $n$ represents the integer 1 or 0, and Z stands for hydroxy, chlorine, di(lower alkyl)-amino, thiosulfato or sulfato, said dyestuffs being suitable for the dyeing of wool, silk, fibres of polyamides and especially of native or regenerated cellulose fibres, the dyeings obtained on said fibrous materials being distinguished by a high tinctorial strength, by good fastness to wetting and to light, and a good resistance to dry cleaning.

---

The present invention provides new valuable disazo dyestuffs of the general Formula 1A

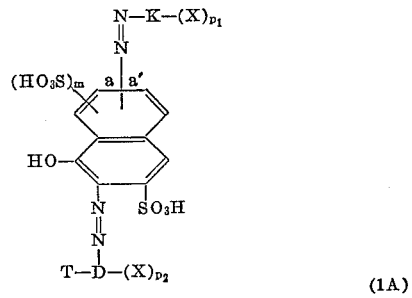

and complex metal compounds of disazo dyestuffs of the general Formula 1B

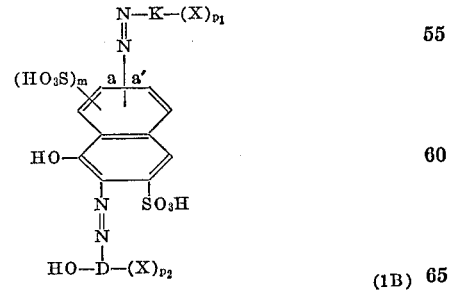

in which D represents the radical of a diazo component of the benzene or naphthalene series, T standing in a position adjacent to the azo group represents a hydrogen atom or a hydroxy or methoxy group capable of forming a complex metal compound, K represents the radical of a coupling component of the pyrazolone series, $m$ represents the integer 1 or, preferably, 0, X represents one of the groupings of the formulae

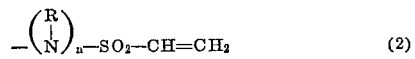

and

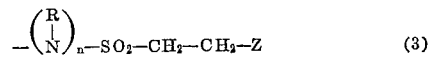

in which R represents a hydrogen atom or a hydrocarbon radical containing 1 to 4 carbon atoms, Z represents an inorganic or organic radical which can be split off by alkaline agents, and $n$ represents the integer 1 or, preferably, 0, $p_1$ and $p_2$ represent the integer 0, 1 or 2, the sum of $p_1+p_2$ being at least 1 and at most 2, and the radical —N=N—K is bound to the naphthalene nucleus at $a$ or $a'$.

These new dyestuffs of the above-indicated formulae can be prepared
(a) By treating, if desired, with agents yielding metal, 1 mol of an aminoazo dyestuff of the Formula 4

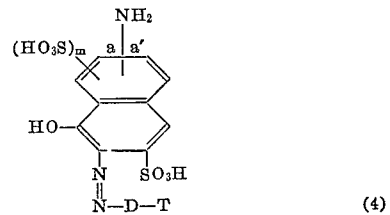

in which D, T and $m$ are defined as above and the amino group is linked to the naphthalene nucleus on $a$ or $a'$, and subsequently diazotizing the metalliferous complex monoazo dyestuff, coupling it with 1 mol of a coupling component of the pyrazolone series to obtain the corresponding disazo dyestuff, it being advantageous in some cases in order to complete the coupling reaction to use, instead of 1 mol, a slight excess, for example, 1.1 mol of the coupling component of the pyrazolone series, or treating, if desired, the mentioned metal-free disazo dyestuff with metal donors, or
(b) By coupling 1 mol of an azo dyestuff of the Formula 5

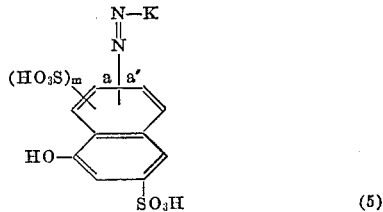

in which K and m are defined as above and the radical —N=N—K is linked to the naphthalene nucleus at a or a', with 1 mol of a diazo component of the benzene or naphthalene series which may contain the group T in a position adjacent to the azo group, at least one of the components used containing a grouping of the Formula 2 or 3, and, if desired, converting, in substance or on a substratum, by reaction with a metal donor, the disazo dyestuffs obtained into the corresponding complex metal compound. The metalliferous disazo dyestuffs of the present invention may be de-metallised, if desired.

As radical Z, which can be split off upon reaction with an alkaline agent, there may be mentioned, for example, a halogen atom such as a chlorine atmo, an alkyl- or aryl-sulfonic acid ester group or an acyloxy group such, for example, as the acetoxy group, furthermore a phenoxy group or a dialkylamino group such, for example, as the dimethyl- or diethyl-amino group, furthermore the thiosulfuric acid ester group and, especially, the sulfuric acid ester group. The diazo components and coupling components used for preparing the disazo dyestuffs of the present invention may contain, in addition to one of the above-indicated groupings (2) or (3), the substituents usually contained in azo dyestuffs, for example, halogen atoms, or alkyl, alkoxy, carboxylic acid, nitro, acetylamino or especially, sulfonic acid groups.

As metal donors, there are preferably used copper, cobalt and chromium compounds. Suitable are, for example, the corresponding water-soluble salts such as sulfates, chloride, acetates, formiates and the salts of organic sulfonic acids. As groups which form metal complexes or as groups which under the conditions of metallisation are convertible into such groups, there are mentioned in the first instance the hydroxy group, the carboxy group and alkoxy groups. The copper complex dyestuffs of the present invention are 1:1 complex metal dyestuffs, whereas the cobalt and chromium dyestuffs of the present invention are 1:2 complex metal dyestuffs.

Instead of using diazo components or coupling components which contain a group of the Formula 3, it is also possible according to a modification of the process of manufacture to introduce this group subsequently into the complete disazo dyestuff. For example, a grouping of the Formula 2 contained in the disazo dyestuffs of the present invention can be reacted with salts of thiosulfuric acid, whereby a β-thiosulfato-ethyl-sulfone group is formed. Furthermore, the group of the Formula 2 can be converted into a β-dialkyl-aminoethyl-sulfone group by the reaction with a dialkyl amine.

A further modification of the process consists in using, for the preparation of the disazo dyestuffs, diazo components or coupling components which contain a group of the Formula 6

in which R and n are defined as above, instead of the above-mentioned groupings (2) or (3), and converting the β-hydroxy group, after preparation of the disazo dyestuff, either prior to or after metallisation, in substance or in a manner known per se, into the sulfuric acid semi-ester group.

The disazo dyestuffs obtained by the process described above can be used in metal-free form or, preferably, in the form of complex metal compounds, for the dyeing or textile materials. The new dyestuffs are distinguished by a high tinctorial strength and have excellent properties for the dyeing of wool, silk and polyamide fibres; they are applied from an acid, neutral or weakly alkaline dye bath. They are particularly valuable as "reactive dyestuffs" for the dyeing of cotton and other native or regenerated cellulose fibres. For the dyeing of such materials, the dyestuffs are applied according to printing or dyeing processes which are combined with a treatment with an acid binding agent such as sodium hydroxide, sodium carbonate or sodium bicarbonate.

Processes of this kind are described in the literature (cf. Melliand Textilberichte 1959, 539 and 1965, 286). By these processes, above all cellulosic textile materials can be dyed deep shades, especially brown, red brown and similar shades, these dyeings are essentially faster to washing than dyeings of similar shade produced with direct dyestuffs. As regards the other fastness properties, the dyeings and prints have a particularly good fastness to wetting and to light and a good resistance to dry cleaning.

The following examples illustrate the invention but they are not intended to limit it thereto:

Example 1

(a) 23.9 parts by weight of 1-amino-8-hydroxynaphthalene-6-sulfonic acid are dissolved in 100 parts by volume of water with the addition of a dilute sodium hydroxide solution to keep the solution neutral and the whole is combined with 20.5 parts by volume of a 5 N sodium nitrite solution. The solution thus obtained is allowed to run into a mixture of 50.0 parts by volume of concentrated hydrochloric acid and 100 parts by volume of ice, while stirring vigorously. The mixture is stirred for 6 hours at 0° to 5° C. and the excess of nitrous acid is destroyed by the addition of amidosulfonic acid. A solution is then added which has been prepared from 17.5 parts by weight of 1-(4'-sulfo phenyl)-3-methyl-5-pyrazolone and 200 parts by volume of water and which has been neutralized by a dilute sodium hydroxide solution. During coupling, the pH of the mixture is maintained at 5.0 to 5.5 by adding a dilute sodium hydroxide solution. After termination of coupling, the mixture is acidified with hydrochloric acid and the monoazo dyestuff is isolated by salting out with 25% of potassium chloride (referred to the volume of the solution) and by filtration.

(b) The monoazo dyestuff thus obtained, which in the form of the free acid corresponds to the formula

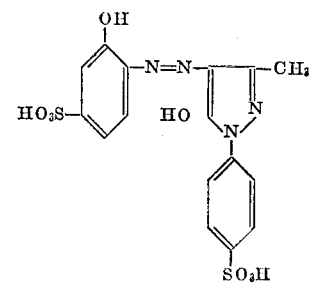

is dissolved in 500 parts by volume of water and the solution is combined, at 5° to 10° C., with a suspension of a dizanium salt obtained by diazotizing 33 parts by weight of 2-amino-1-methoxy-benzene-4-β-hydroxyethyl-sulfone sulfuric acid ester (having a strength of 94% by weight) in a mixture of 150 parts by volume of water and 80 parts by weight of ice with 20 parts by volume of a 5 N sodium nitrite solution. The pH-value is adjusted to 6.0–7.0 by the addition of sodium carbonate and maintained at this value during the coupling reaction which is carried out at a temperature in the range of 5° to 10° C. After 12 hours, 25% of potassium chloride (calculated on the volume of the solution) are added to the red brown solution. The dyestuff that has precipitated can then be isolated by filtration. It is washed with a solution of potassium chloride and dried under reduced pressure at 60° C. A dark powder which dissolves in water to give a reddish brown solution is obtained. The new dyestuff which in the form of the free acid corresponds to the formula

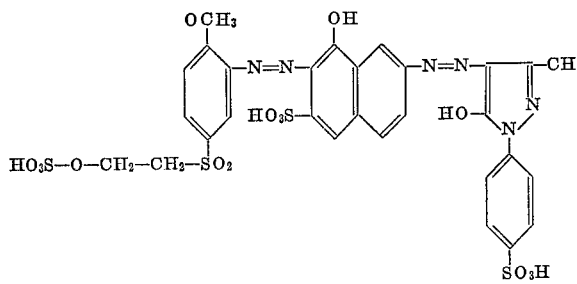

gives on cotton, in the presence of sodium hydroxide, full red brown dyeings which are fast to light and to washing.

(c) 72.9 parts by weight of the disazo dyestuff thus obtained are introduced, in form of the potassium salt, into 500 parts by volume of water and combined with 25 parts by weight of crystalline copper sulfate and 20 parts by weight of crystalline sodium acetate (pH-value 4.2). The mixture is then heated and boiled for 11½ hours under reflux cooling. The dyestuff solution is then cooled to 10° C. and the copper complex dyestuff that has formed is salted out with 25% of potassium chloride, (calculated on the volume of the solution). The product is filtered off, washed with a potassium chloride solution and dried at 60° to 70° C. under reduced pressure. A dark violet brown powder is obtained which dissolves in water to give a red brown solution. The copper complex disazo dyestuff thus obtained which in form of the free acid corresponds to the formula

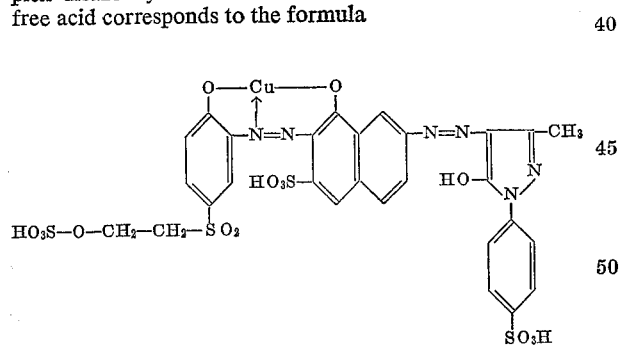

yields in the presence of sodium bicarbonate a full red brown print which is very fast to light and to washing.

Example 2

(a) 54.2 parts weight of the aminoazo dyestuff of the formula

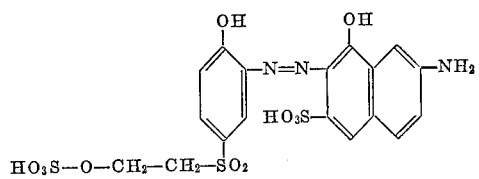

are dissolved in form of the sodium salt, at 80° to 90° C., in 1550 parts by volume of water and the solution is combined with 20 parts by volume of a 5 N solution of sodium nitrate. The dyestuff solution thus prepared is then allowed to run into a mixture of 70 parts by volume of 5 N hydrochloric acid and 100 parts by weight of ice, in the course of 2 hours and with intense stirring and while maintaining a temperature of 0° to 5° C., if necessary by adding ice. After completion of the diazotization, the mixture is cautiously neutralized by means of a dilute sodium hydroxide solution and then combined, at 5°–10° C., with a neutralized solution of 1-(4'-sulfophenyl)-3-methyl-5-pyrazolone in 200 parts by volume of water. By adding sodium carbonate it is ensured that the coupling proceeds at a pH-value of 6.5–7.0. When coupling is complete, the disazo dyestuff obtained is salted out by means of 25% of potassium chloride (referred to the volume of the solution) and isolated by filtration.

(b) When cellulose fibers are treated in the presence of sodium hydroxide with the dyestuff thus prepared which in form of the free acid corresponds to the formula

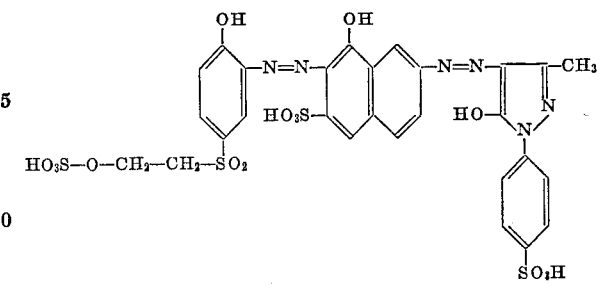

and the fibers are then treated with an acetic copper sulfate solution at 50°–60° C., a red brown dyeing is obtained which is fast to light and to washing.

Example 3

(a) 51.9 parts by weight of the aminoazo dyestuff of the formula

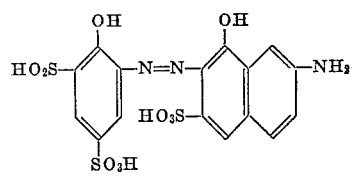

and 21 parts by volume of a 5 N solution of sodium nitrate are dissolved in 750 parts by volume of water. The solution thus prepared is added dropwise, with vigorous stirring, to a mixture of 21 parts by volume of concentrated hydrochloric acid and 200 parts by volume of ice. When the diazotization is complete, the mixture is combined with a solution of the sulfuric acid ester of 1-(4'-β-hydroxyethyl-sulfonylphenyl)-3-methyl-5-pyrazolone which has been prepared by esterification of 30 parts by weight of 1-(4'-β-hydroxy-ethyl-sulfonyl-phenyl)-3-methyl-5-pyrazolone (having a strength of 94%) in 120 parts by weight of concentrated sulfuric acid, pouring on ice and neutralization by means of a sodium hydroxide solution. Coupling is effected at a pH-value of 6.5–7.0, which is maintained by the addition of sodium carbonate, and, when coupling is complete, the disazo dyestuff that has formed is salted out by the addition of 25% of potassium chloride (calculated on the volume of the solution).

(b) In order to convert the disazo dyestuff prepared according to (a) into its copper complex compound, the said dyestuff is dissolved, at 60° C., in 800 parts by volume of water with the addition of 40 parts by weight of crystalline sodium acetate. 25 parts by weight of crystalline copper sulfate are added and the mixture is kept for 4 hours at a temperature of 75–80° C. In order to isolate the copper complex dyestuff, which in the form of the free acid corresponds to the formula

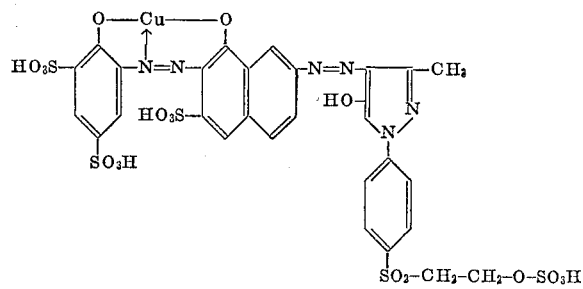

the dyestuff solution is saturated with potassium chloride, stirred for 3 hours at 10°–15° C. and then filtered.

The dyestuff obtained gives on cotton, in the presence of sodium hydroxide, strongly reddish brown dyeings which are well resistant to dry cleaning and to washing.

Example 4

(a) 54.2 parts by weight of the aminoazo dyestuff of the formula

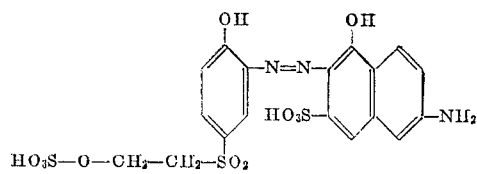

are dissolved in form of the sodium salt, at 80°–90° C., in 700 parts by volume of water and the whole is combined with 20 parts by volume of a 5 N sodium nitrite solution. The solution thus obtained is allowed to slowly run into a mixture of 50 parts by volume of 5 N hydrochloric acid and 100 parts by weight of ice. The whole is stirred for 6 hours at 0°–5° C. and neutralized by means of sodium bicarbonate (pH-value 5.5). The solution is combined with a neutralized solution of 68.0 parts by weight of 1-(2'-methyl-4',5'-disulfophenyl)-3-methyl-5-pyrazolone (having a strength of 55.6%) in 100 parts by volume of water and by adding sodium carbonate to the coupling mixture it is ensured that coupling takes place at a pH-value of 6.0–6.5. When the reaction is complete, the dyestuff solution is combined with 25% of potassium chloride (referred to the volume of the solution), stirred for 3 hours at 5° to 10° C. and then filtered.

(b) The disazo dyestuff obtained according to (a) is dissolved at 50° C. in 800 parts by volume of water. This solution is combined with 25 parts by weight of crystalline copper sulfate and 30 parts by weight of crystalline sodium acetate (pH-value 5.5) and the mixture is stirred for 2 hours at 50°–60° C. The dyestuff is isolated by salting out with potassium chloride, filtration and washing with a potassium chloride solution and then dried at 50° to 60° C. under reduced pressure.

The dyestuff thus prepared corresponds to the formula

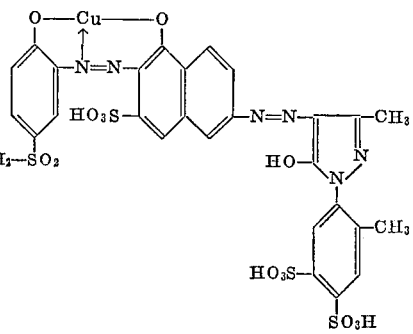

It constitutes a dark violet brown powder which gives on cotton, in the presence of sodium carbonate, a brown-violet print which is fast to washing and to light.

Example 5

50.4 parts by weight of the monoazo dyestuff of the formula

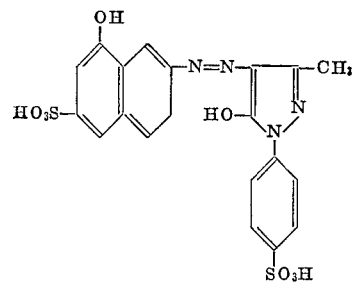

are introduced in form of the potassium salt into a diazo suspension obtained by diazotizing 35 parts by weight of 2-amino-1,4-dimethoxy-benzene-5 - β-hydroxyethylsulfone sulfuric acid ester (having a strength of 98% by weight) in a mixture of 500 parts by volume of water, 18 parts by volume of concentrated hydrochloric acid and 50 parts by weight of ice, with 20 parts by volume of a 5 N sodium nitrite solution. The pH of the reaction mixture is then brought to 6.0 by adding sodium bicarbonate and kept at this pH-value by further addition of sodium bicarbonate. The brown solution thus formed is then saturated with potassium chloride whereby the disazo dyestuff is salted out. The product is filtered off, washed with a potassium chloride solution and dried. The new dyestuff, which in the form of the free acid corresponds to the formula

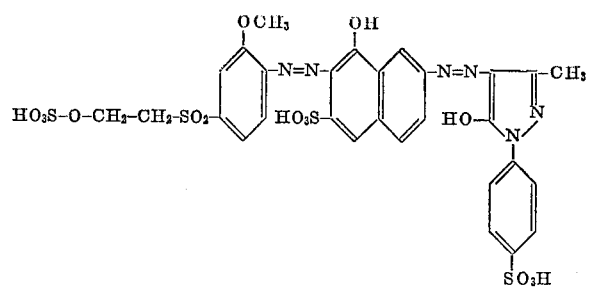

is a dark brown powder which dissolves in water to give a red brown solution.

This dyestuff dyes cellulose fibers in the presence of sodium hydroxide deep brown shades which are fast to washing and to light.

Example 6

50.4 parts by weight of the monoazo dyestuff of the formula

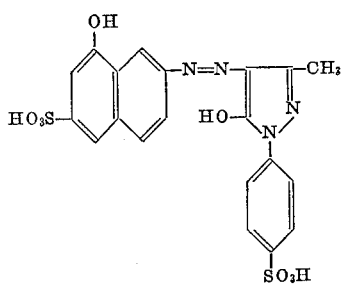

are coupled with 35 parts by weight of diazotized 2-amino-1,4-dimethoxy-benzene-5-β-hydroxyethyl-sulfone sulfuric acid ester (having a strength of 98% by weight). When coupling is completed, 27 parts by weight of crystalline sodium acetate and 24.5 parts by weight of crystalline copper sulfate are added and the pH-value is adjusted to 5.0–5.2 by adding a dilute sodium carbonate solution. The mixture is boiled for 15 hours under reflux cooling and is then evaporated under reduced pressure to isolate the copper complex dyestuff. The dyestuff obtained, which in the form of the free acid corresponds to the formula

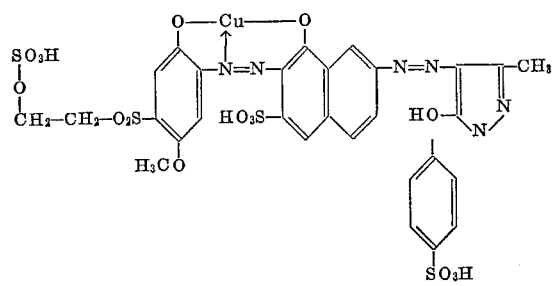

constitutes a dark powder which gives on cotton, in the presence of sodium carbonate, intense red brown prints which are fast to dry cleaning, washing and to light.

Example 7

55.8 parts by weight of the aminoazo dyestuff of the formula

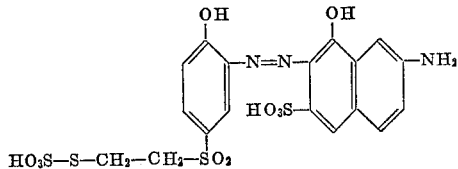

obtained by coupling diazotized 2-amino-1-hydroxyphenyl-4-β-thiosulfato-ethyl sulfone with 3-amino-hydroxynaphthalene-7-sulfonic acid in a weakly alkaline medium, are dissolved in form of the potassium salt in a mixture of 1850 parts by volume of water and 20 parts by volume of a 5 N sodium nitrite solution. The dyestuff solution obtained is allowed to run, in the course of about 1 hour and while stirring vigorously, into a mixture of 70 parts by volume of 5 N hydrochloric acid and 100 parts by weight of ice, while maintaining the temperature at 0 to 5° C.

When the diazotization is completed, the mixture is cautiously neutralized by means of a dilute sodium hydroxide solution and then combined, at 5–10° C., with a neutralized solution of 1-(3'-sulfophenyl)-3-methyl-5-pyrazolone in 200 parts by volume of water. Coupling is then effected at a pH-value of 6.5 to 7.0. When coupling is completed, the disazo dyestuff is precipitated by salting out with potassium chloride, filtered off and washed.

For converting the disazo dyestuff obtained into the copper complex compound, the said dyestuff is dissolved at 60° C. in 850 parts by volume of water with the addition of 35 parts by weight of crystalline sodium acetate. 25 parts by weight of crystalline copper sulfate are added and the mixture is heated for 4 hours at 75–80° C. For isolating the copper complex dyestuff which in form of the free acid corresponds to the formula

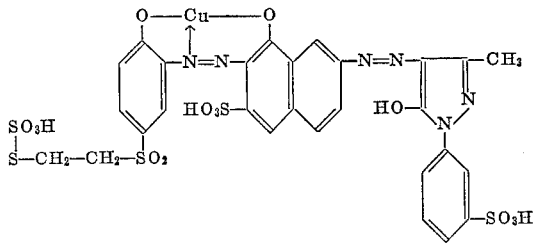

the solution is saturated with potassium chloride, stirred for 2 hours at 0 to 5° C. and isolated by filtration.

The dyestuff gives on cotton, in the presence of sodium hydroxide, a red brown print which is fast to light and to washing.

Example 8

43.7 parts by weight of the copper complex disazo dyestuff of the formula

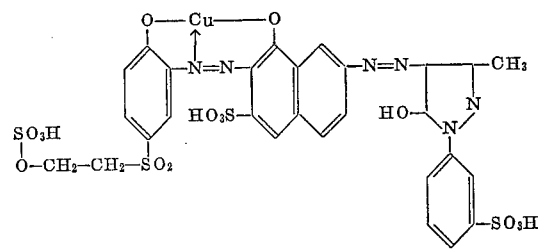

are dissolved in form of the potassium salt, at 50° to 60° C., in 875 parts by volume of water and then rapidly combined with such an amount of binormal sodium hydroxide solution in such a manner that the pH-value remains at 11.5 to 12.0; the pH of the mixture is then brought rapidly to a value of 5.2–5.7 by means of acetic acid and the mixture is combined with 17 parts by weight of crystal-water-containing sodium thiosulfate. The reaction mixture is then stirred for 6 hours at 55° to 65° C., during which time the aforesaid pH-value is maintained by dropwise addition of dilute acetic acid. The dyestuff solution is then filtered while still hot and evaporated under reduced pressure. The formula of the dyestuff obtained corresponds to the formula of the copper complex dyestuff used at the beginning, but contains instead of the grouping —$SO_2$—$CH_2$—$CH_2$—O—$SO_3H$ the grouping —$SO_2$—$CH_2$—$CH_2$—S—$SO_3H$.

43.7 parts by weight of the copper complex disazo dyestuff used in the present example as the starting substance, are dissolved at 50° C., in form of the potassium salt, in 875 parts by volume of water. 10 parts by weight of diethylamine are added dropwise, at 40 to 50° C. The mixture is stirred for 16 to 20 hours, at 20° to 40° C., and the pH of the mixture is then brought to 6.0 by means of dilute acetic acid. The reaction product is salted out with potassium chloride, washed with a solution of potassium chloride and then dried. In the form of the free acid, it has the formula

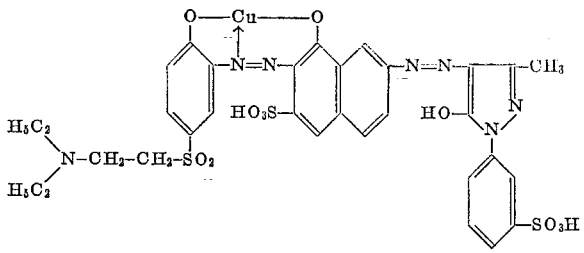

and gives on cellulose, in the presence of sodium hydroxide, red brown prints which are fast to light and to washing.

Example 9

36.5 parts by weight of the disazo dyestuff obtained by acid coupling of the diazotized aminoazo dyestuff of the formula

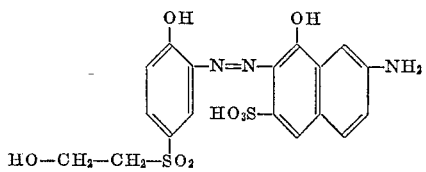

with 1-(4'-sulfophenyl)-3-methyl-5-pyrazolone, are slowly introduced, as potassium salt in finely ground form, into 300 parts by weight of concentrated sulfuric acid and stirred for several hours at room temperature until all components are completely dissolved. The mixture is then poured on 900 parts by weight of ice, the esterified dyestuff is salted out by the addition of potassium chloride and filtered with suction. The wet filter cake is washed with a solution of potassium chloride until it is free from acid and dried at 60 to 70° C. under reduced pressure. If this dyestuff is applied to cotton or cellulose in the presence of an agent binding acid and if the material is aftertreated with an acetic copper sulfate solution, a red brown dyeing is obtained which is fast to washing.

Example 10

39.7 parts by weight of the copper complex disazo dyestuff of the formula

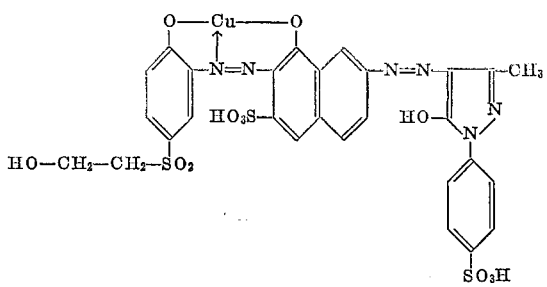

are introduced as potassium salt and in finely ground form, into 400 parts by volume of anhydrous pyridine and after the addition of 4 parts by weight of urea, the whole is heated to 85° C. At this temperature, 20 parts by weight of amidosulfonic acid are slowly added and the whole is then heated for about one hour to 100°–105° C. About 200 parts by volume of pyridine are then distilled off under reduced pressure and, after cooling, the mixture is poured into 1000 parts by volume of water. The mixture is weakly acidified by cautious addition of dilute hydrochloric acid and then saturated with potassium chloride. The dyestuff is salted out and isolated in the usual manner and dried. With regard to its structure, the dyestuff corresponds to that represented by the formula of the copper complex diazo dyestuff used at the beginning, but contains instead of the grouping

—SO$_2$—CH$_2$—CH$_2$—OH the grouping —SO$_2$—CH$_2$—CH$_2$—O—SO$_3$H.

Example 11

56.9 parts by weight of the aminoazo dyestuff of the formula

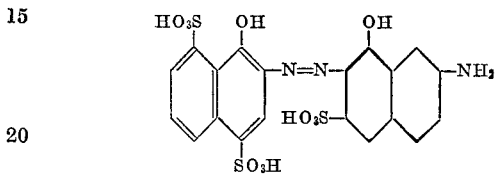

are dissolved at 50°–60° C., in form of the sodium salt, in 600 parts by volume of water and the solution is combined with 20 parts by volume of a 5 N sodium nitrite solution. The solution obtained is then allowed to run, in the course of 1 hour, into a mixture of 200 parts by weight of ice powder and 20 parts by volume of concentrated hydrochloric acid, while taking care, if necessary by external cooling, that the temperature does not exceed 5° C. The mixture is stirred for 4 hours at 0° to 5° C. and the excess of nitrous acid is destroyed by the addition of amido-sulfonic acid. After having adjusted the pH-value to 6.5 by adding sodium carbonate, 72.5 parts by weight of 1 - (4' - β - hydroxy - ethyl - sulfone sulfuric acid ester phenyl)-3-methyl-5-pyrazolone (having a strength of 50% by weight) in form of the monosodium salt are added to the solution of the diazonium salt. The pH-value of the coupling mixture is kept at 6.5 to 7.0 by dropwise adding dilute sodium carbonate solution. When coupling is completed, 27.5 parts by weight of crystalline copper sulfate and 40 parts by weight of crystalline sodium acetate are added and the pH is adjusted to 5.0 to 5.5 by means of dilute acetic acid. The mixture is stirred for 2½ hours at 60° C. and evaporated under reduced pressure in order to isolate the copper complex compound which has formed. The dyestuff thus obtained, which in form of the free acid corresponds to the formula

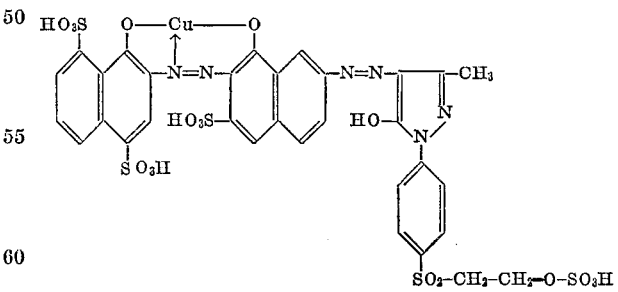

constitutes a dark violettish powder which dissolves in water to give a red brown solution. In the presence of sodium hydroxide, it dyes cotton full violet brown shades which are fast to light and to washing.

The dyestuffs listed in the following table can be prepared by methods which are similar to those described in the foregoing examples. They give on cellulosic materials dyeings and prints which also have very good fastness properties. The Roman numerals in the table indicate which of the following compounds was used as the first coupling component: 3-amino-5-hydroxynaphthalene-7-sulfonic acid (I), 2-amino-5-hydroxynaphthalene-7-sulfonic acid (II), 3-amino-5-hydroxy-naphthalene-2,7-disulfonic acid (III) or 2-amino-5-hydroxy-naphthalene-1,7-disulfonic acid (IV).

| Diazo component | Coupling component | Metal | Shade |
|---|---|---|---|
| 2-amino-1-methoxybenzene-4-β-hydroxyethyl-sulfone-sulfuric acid ester (I). | 1-(4'-sulfophenyl)-3-carboxy-5-pyrazolone | | Brown. |
| Do | 1-(4',8'-disulfo-2'-naphthyl)-3-methyl-5-pyrazolone. | | Do. |
| Do | 1-(2'-chloro-5'-sulfophenyl)-3-methyl-5-pyrazolone. | | Do. |
| 2-amino-1-hydroxybenzene-4-β-hydroxyethyl sulfone-sulfuric acid ester (I). | ...do... | Cu | Red brown. |
| 2-amino-1-methoxybenzene-4-β-hydroxyethyl-sulfone-sulfuric acid ester (I). | 1-(2'-methyl-4'-sulfophenyl)-3-methyl-5-pyrazolone. | | Brown. |
| 2-amino-1-hydroxybenzene-4-β-hydroxyethyl sulfone-sulfuric acid ester (I). | 1-(2'-5'-dichloro-4'-sulfophenyl)-3-methyl-5-pyrazolone. | Cu | Do. |
| 2-amino-1-hydroxybenzene-4-β-hydroxyethyl-sulfone-sulfuric acid ester (II). | 1-(3'-sulfophenyl)-3-carboxy-5-pyrazolone. | Cu | Violet brown. |
| 2-amino-1-methoxy-4-methyl-5-β-hydroxyethyl-sulfone-sulfuric acid ester (I). | 1-(4'-sulfophenyl)-3-methyl-5-pyrazolone. | | Red brown. |
| 1-aminobenzene-3-β-hydroxy-ethylsulfone-sulfuric acid (I). | ...do... | | Yellowish brown. |
| 1-amino-4-N-methyl-ethionyl-aminobenzene (I) | ...do... | | Red brown. |
| 2-amino-1-hydroxy-4-(N-methyl-ethionylamino)-benzene. | ...do... | Cu | Do. |
| 6-nitro-2-amino-1-hydroxybenzene-4-β-hydroxy-ethylsulfone-sulfuric acid ester (I). | 1-(4'-sulfophenyl)-3-carboxy-5-pyrazolone. | Cu | Brown. |
| 1-amino-2-methoxy-5-(N-ethyl-ethionylamino)-benzene. | 1-(4'-sulfophenyl)-3-methyl-5-pyrazolone. | | Do. |
| 1-amino-4-(N-butyl-ethionyl-amino)-benzene | ...do... | | Do. |
| 1-amino-4-(N-methyl-β-thio-sulfato-ethylsulfonylamino)-benzene. (I). | ...do... | | Do. |
| 2-amino-1-hydroxybenzene-4-β-hydroxyethyl-sulfone-sulfuric acid ester (I). | ...do... | Cr | Grey. |
| 2-amino-1-hydroxybenzene-4-β-hydroxyethyl-sulfone-sulfuric acid ester (III). | ...do... | Cr | Do. |
| 2-amino-1-hydroxybenzene-4-β-hydroxyethyl-sulfone-sulfuric acid eater (I). | ...do... | Co | Brown. |
| 2-amino-1-hydroxybenzene-4-β-hydroxyethyl-sulfone-sulfuric acid ester (I). | 1-(4',8'-disulfo-2'-naphthyl)-3-methyl-5-pyrazolone. | Cr | Black brown. |

Example 12

(a) 54.2 parts by weight of the aminoazo dyestuff of the formula

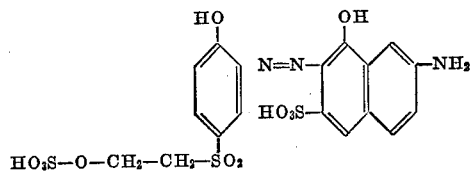

are introduced in form of the sodium salt into 550 parts by volume of water and the solution is combined with 27.5 parts by weight of crystalline copper sulfate and 20 parts by weight of crystalline sodium acetate. The mixture is stirred for 2 hours at 50° to 60° C. (pH-value 4.8), whereby a red brown solution is formed. After termination of the formation of the copper complex, the solution is combined with 20% of potassium chloride (referred to the volume of the solution) and the copper complex dyestuff that has precipitated is isolated by filtration and then washed with a solution of potassium chloride.

(b) The dyestuff prepared according to (a), which in form of the free acid corresponds to the formula

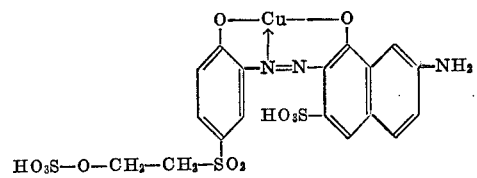

is dissolved at 70° C. in 600 parts by volume of water and combined with 20 parts by volume of a 5 N sodium nitrite solution. The dyestuff solution thus obtained is cooled to 20° C. and then added dropwise to a vigorously stirred mixture of 110 parts by weight of ice powder and 35 parts by volume of acetic acid (pH-value 4). Stirring is continued for 2 hours at 0° to 5° C. and the pH-value is adjusted to 6.0 by the addition of sodium bicarbonate. This mixture is combined with a neutralized solution of 25.2 parts by weight of 1-(4'-sulfonphenyl)-3-carboxy-5-pyrazolone in 200 parts by volume of water. Coupling is effected at a pH-value of 6.5 to 7.0 which is maintained by adding sodium bicarbonate. The disazo dyestuff formed is isolated by spray-drying. In the form of the free acid it corresponds to the formula

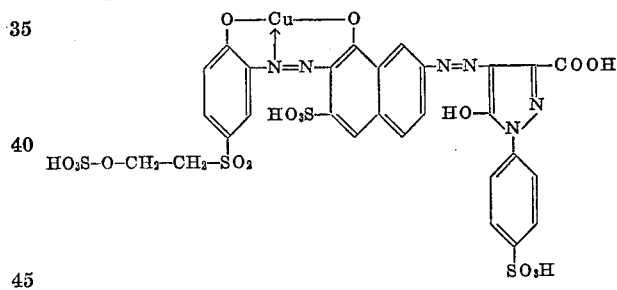

It constitutes a dark powder having a metallic lustre and gives on cotton, in the presence of sodium carbonate, a red brown print which is fast to washing and to light.

(c) For decoppering, the copper complex disazo dyestuff obtained according to (b) is dissolved, at 50° to 60°, in 2350 parts by volume of water. The red brown solution is combined with concentrated hydrochloric acid (pH-value 1), whereupon the solution turns brown. The product is salted out with potassium chloride at 0° to 10° C., filtered off and washed thoroughly with a potassium chloride solution which has been acidified with hydrochloric acid.

The dyestuff obtained of the formula

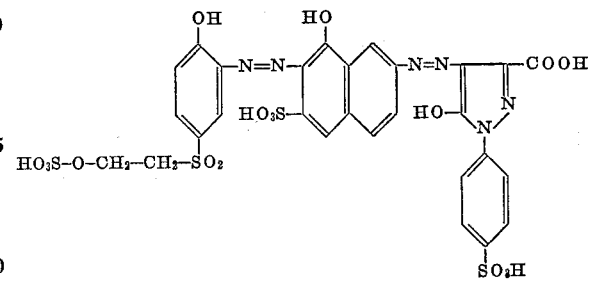

constitutes as dry sodium salt a dark brown powder; it can be used in known manner for the preparation of complex metal compounds of other metals such as cobalt or chromium.

Example 13

(a) For conversion into the chromium complex compound, 54.2 parts by weight of the aminoazo dyestuff of the formula indicated in Example 1a are dissolved in 1310 parts by volume of water and the solution is combined with 25 parts by weight of chrome alum and 30 parts by weight of crystalline sodium acetate (pH-value 5.0). The mixture is boiled for 11 hours under reflux cooling and then cooled to 20° C. The dyestuff that has formed is salted out with 20% of sodium chloride (referred to the volume of the solution), filtered off and washed with a solution of sodium chloride.

(b) The dyestuff obtained according to (a), which in form of the free acid corresponds to the formula

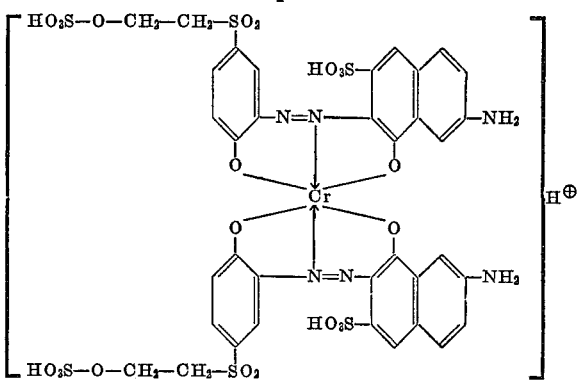

is dissolved in a mixture of 520 parts by volume of water and 20 parts by volume of a 5 N sodium nitrite solution. This solution is added dropwise, at 0° to 10° C., to a mixture of 150 parts by weight of ice powder and 20 parts by volume of concentrated hydrochloric acid. Stirring is continued until diazotization is completed, the small excess of nitrous acid is destroyed by the addition of amidosulfonic acid and the mixture is neutralized with sodium carbonate to a pH-value of 6.0. The solution is then combined, at 5° to 10° C., with a neutralized solution of 25.2 parts by weight of 1-(4'-sulfophenyl)-3-carboxy-5-pyrazolone in 200 parts by volume of water. Coupling is effected at a pH-value of 6.0 to 7.0. When coupling is completed, the 1:2 chromium complex dyestuff is precipitated by salting out with 20% of sodium chloride (referred to the volume of the solution), filtered off and washed. After drying at 60° C., there is obtained a black, salt-containing powder which contains the dyestuff of the formula

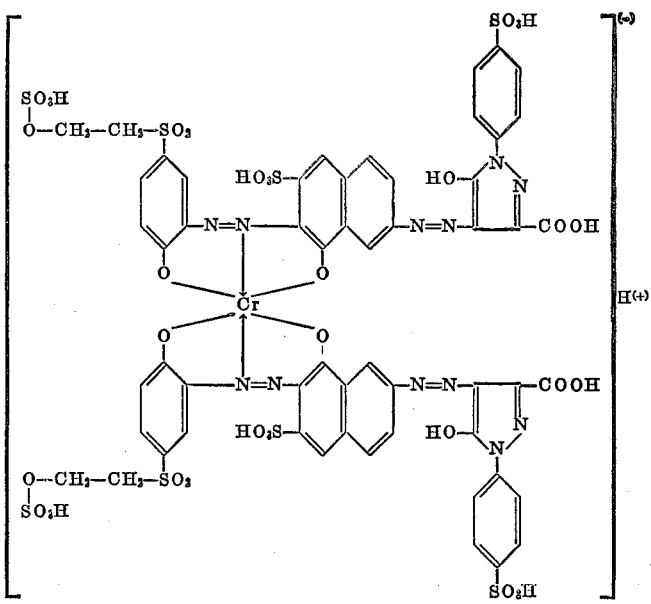

in form of the sodium salt.

This dyestuff gives on cotton, in the presence of sodium hydroxide, a grey dyeing which is fast to light and to washing.

Example 14

(a) 54.2 parts by weight of the aminoazo dyestuff of the formula

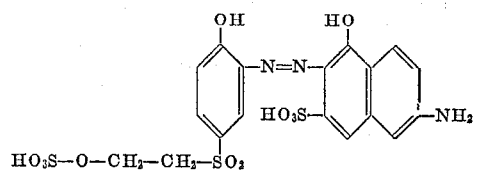

are dissolved in form of the sodium salt, at 80° to 90° C., in 800 parts by volume of water and to this solution are added 15.4 parts by weight of crystalline cobalt sulfate and 13 parts by weight of crystalline sodium acetate. The mixture is stirred for 4 hours at 70° to 75° C. until the formation of the cobalt complex compound is complete; it is then cooled to 10° C. and saturated with potassium chloride. The precipitated dyestuff is filtered off and washed with a solution of potassium chloride.

(b) The dyestuff obtained according to (a) which in form of the free acid corresponds to the formula

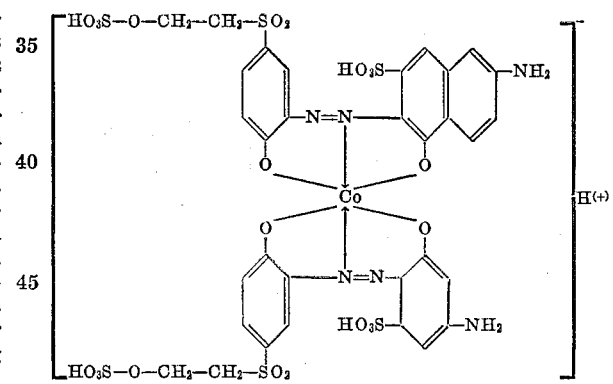

is dissolved in a mixture of 610 parts by volume of water and 20 parts by volume of a 5 N sodium nitrite solution. This solution is allowed to run into a mixture of 150 parts by weight of the ice powder and 20 parts by volume of concentrated hydrochloric acid and the whole is stirred at 0° to 10° until diazotization is completed. The excess of nitrous acid is destroyed by the addition of amidosulfonic acid. The diazonium solution is then neutralized by means of sodium bicarbonate (pH-value 6.0) and combined with a neutralized solution of 28.7 parts by weight of 1-(2'-chloro-5'-sulfophenyl)-3-methyl-5-pyrazolone in 150 parts by volume of water. Coupling is effected at a pH-value of 6.0 to 7.0 and the 1:2 cobalt complex dyestuff is isolated by salting out with sodium chloride. The product is filtered off, washed with a solution of sodium chloride and dried at 60° C. under reduced pressure. A black brown, salt-containing powder is obtained which contains the dyestuff of the formula If, instead of 15.4 parts by weight of crystalline cobalt sulfate, 25 parts by weight of chrome alum are used and the whole is boiled for 11 hours under reflux cooling, a chromium-containing amino-azo dyestuff is obtained which can be converted into the corresponding 1:2 chromium disazo dyestuff according to paragraph (b) by diazotization and coupling with 1-(4'-sulfo phenyl)-3-carboxy-5-pyrazolone. In the presence of sodium carbonate, this dyestuff gives on cotton a deep black print which is very fast to washing.

The dyestuffs listed in the following table can be prepared by methods similar to those described in the foregoing examples. They give on cellulosic materials prints and dyeings which also have very good fastness properties. The Roman numerals in the table indicate which of the following compounds was used as the first coupling component: 3-amino-5-hydroxynaphthalene - 7 - sulfonic

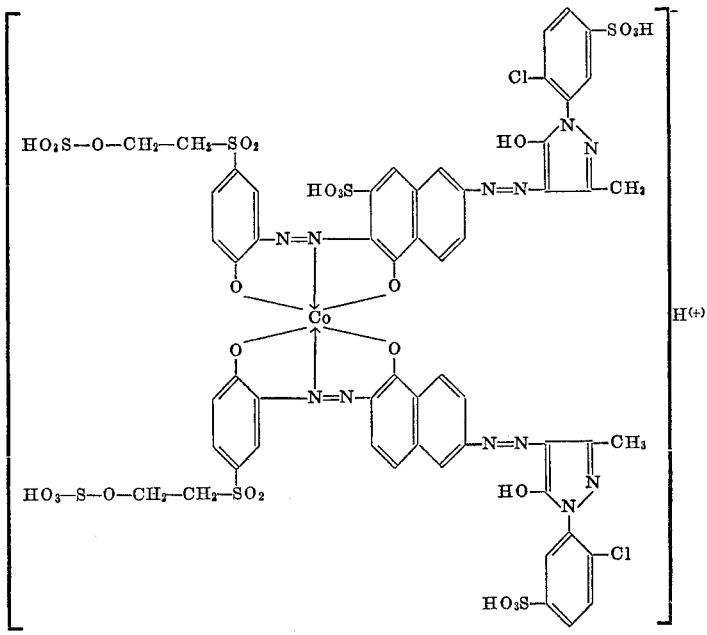

in form of the sodium salt.

This dyestuff gives on cotton, in this presence of sodium carbonate, a brown print which is highly resistant to dry cleaning and to washing.

acid (I), 2-amino - 5 - hydroxy-naphthalene-7-sulfonic acid (II), 3 - amino-5-hydroxynaphthalene-2,7-disulfonic acid (III) or 2-amino-5-hydroxynaphthalene-1,7-disulfonic acid (IV).

| Diazo component | Metal | Coupling component | Shade |
|---|---|---|---|
| 2-amino-1-hydroxybenzene-4-β-hydroxyethyl-sulfone-sulfuric acid ester (I). | Cu | 1-(4',8'-disulfo-2'-naphthyl)-3-methyl-5-pyrazolone. | Red brown. |
| 2-amino-1-hydroxybenzene-4-β-hydroxyethyl-sulfone-sulfuric acid ester (II). | Cu | 1-(4'-sulfophenyl)-3-carboxy-5-pyrazolone. | Violet brown. |
| Do. | Cu | 1-(2'-methyl-4'-,5'-disulfophenyl)-3-carboxy-5-pyrazolone. | Do. |
| 2-amino-1-hydroxybenzene-4-vinylsulfone (I). | Cu | 1-(4'-sulfophenyl)-3-methyl-5-pyrazolone. | Red Brown. |
| 2-amino-1-hydroxy-4-(N-methyl-ethionylamino)-benzene. | Cu | ___do___ | Do. |
| 2-amino-1-hydroxy-4-(N-butyl-ethionylamino)-benzene (I). | Cu | ___do___ | Do. |
| 2-amino-1-hydroxy-4-methoxy-benzene-5-β-hydroxyethyl-sulfone-sulfuric acid ester (I). | Cu | 1-(4'-sulfophenyl)-3-carboxy-5-pyrazolone. | Reddish grey. |
| 2-amino-1-hydroxy-4-(N-methyl-vinylsulfonyl-amino)-benzene (I). | Cu | 1-(3'-sulfophenyl)-3-methyl-5-pyrazolone. | Red brown. |
| 2-amino-1-hydroxybenzene-4-β-hydroxyethyl sulfone-sulfuric acid ester (I). | Cu | 1-(4'β-hydroxyethylsulfone-sulfuric acid ester-phenyl)-3-methyl-5-pyrazolone. | Do. |
| 2-amino-1-hydroxybenzene-4-β-hydroxyethyl-sulfone-sulfuric acid ester (II). | Co | 1-(4'-sulfophenyl)-3-carboxy-5-pyrazolone. | Brown. |
| 2-amino-1-hydroxy-4-(ethionylamino)-benzene (I). | Cu | 1-(4'-sulfophenyl)-3-methyl 5-pyrazolone. | Red brown. |
| 2-amino-1-hydroxybenzene-4-β-hydroxyethyl-sulfone-sulfuric acid ester (IV). | Cu | ___do___ | Violet brown. |
| 2-amino-1-hydroxybenzene-4-β-hydroxyethyl-sulfone-thiosulfuric acid ester (I). | Cu | ___do___ | Red brown. |
| 2-amino-1-hydroxybenzene-4-β-diethylamino-ethyl-sulfone (I). | Cu | ___do___ | Do. |
| 2-amino-1-hydroxybenzene-4-β-chlorethylsulfone (II). | Cu | ___do___ | Violet brown. |
| 2-amino-1-hydroxy-4-(N-butyl-β-thiosulfato-ethyl-sulfonylamino)-benzene (I). | Cu | ___do___ | Red brown. |
| 2-amino-1-hydroxybenzene-4-sulfonic acid (I). | Cu | 1-(4'-β-hydroxyethyl-sulfone sulfuric acid ester-phenyl)-3-methyl-5-pyrazolone. | Do. |
| 2-amino-1-hydroxynaphthalene 6,8-disulfonic acid (I). | Cu | ___do___ | Grey. |
| 2-amino-1-hydroxybenzene 4-β-hydroxyethyl-sulfone-sulfuric acid ester (II). | Cr | 1-(2'-methyl-4'-sulfophenyl)-3-carboxy-5-pyrazolone. | Grey black. |
| Do. | Cr | ___do___ | |

I claim:
1. A disazo dyestuff of the formula

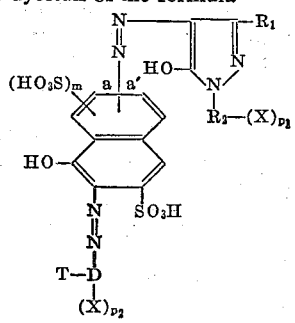
[1A]

or a complex cobalt, copper or chromium disazo dyestuff of the formula

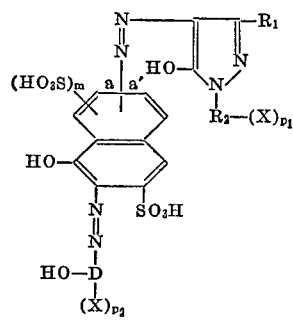
[1B]

wherein D is phenylene or naphthylene unsubstituted or substituted by at most 2 substituents of the group consisting of chlorine, bromine, lower alkyl, lower alkoxy, sulfo, nitro, carboxyl and acetylamino, T is at a position adjacent to the azo group and is hydrogen, hydroxy or lower alkoxy, $m$ is the integer 1 or 0, $R_1$ is lower alkyl or carboxyl, $R_2$ is phenylene or naphthylene unsubstituted or substituted by at most 3 substituents of the group consisting of chlorine, lower alkyl, lower alkoxy and sulfo, X is linked to a carbon atom of the aromatic nuclei D and $R_2$ and is one of the groups

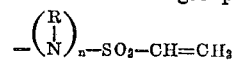

or

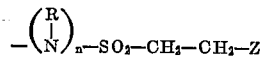

in which R is hydrogen or lower alkyl, $n$ is an integer 1 or 0 and Z is hydroxy, chlorine, di(lower alkyl)-amino, thiosulfato or sulfato, $p_1$ and $p_2$ each is an integer 0, 1 or 2, the sum of $p_1$ and $p_2$ being at least 1 and at most 2, the azo group attached to the pyrazolone ring is linked to the naphthalene nucleus at position $a$ or $a'$, and the metal complex dyestuff is a symmetric 1:2-cobalt or chromium complex compound or a 1:1-copper complex compound.

2. The dyestuff of the formula

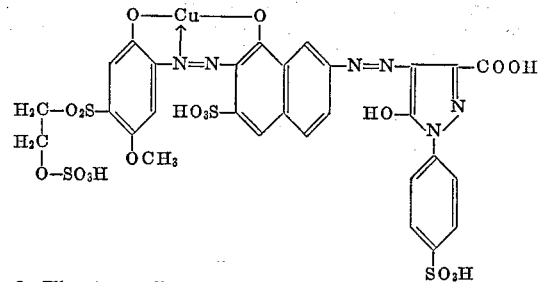

3. The dyestuff of the formula

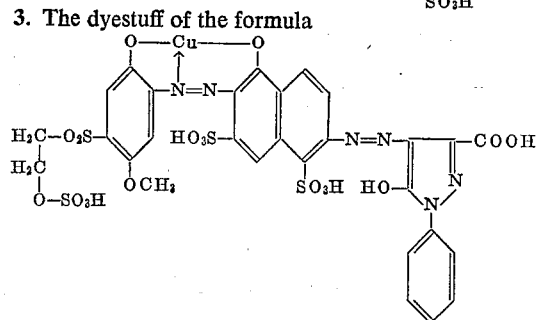

4. The dyestuff of the formula

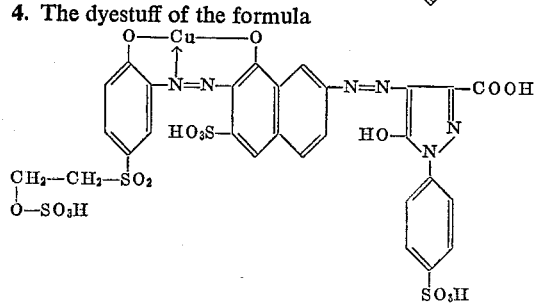

5. The dyestuff of the formula

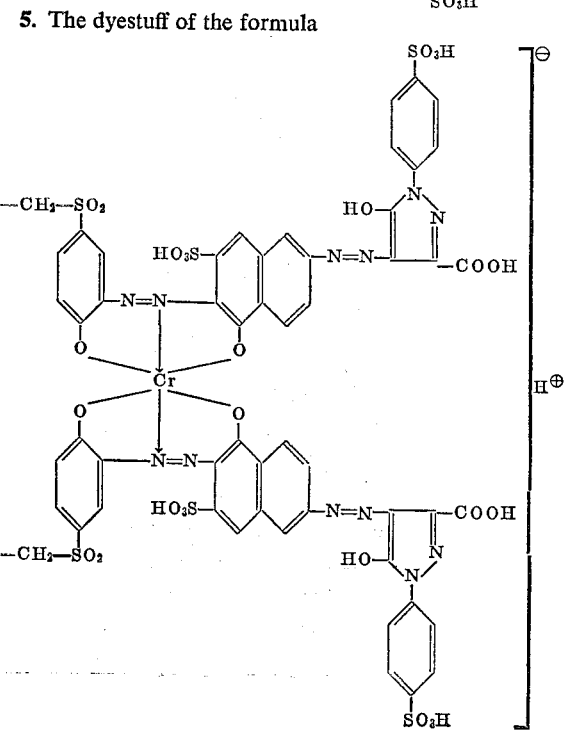

6. The dyestuff of the formula
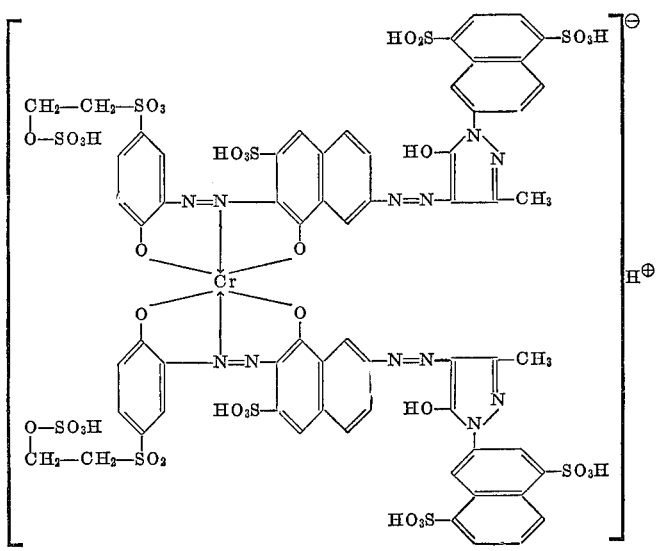
7. The dyestuff of the formula
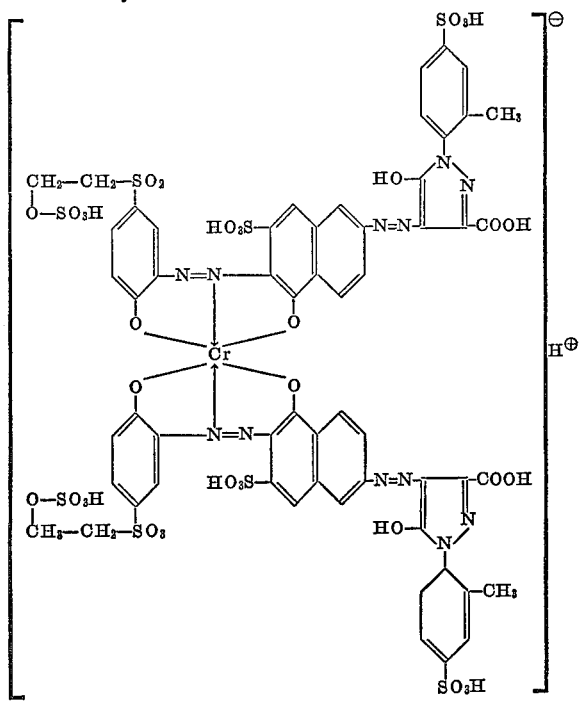
References Cited
UNITED STATES PATENTS
3,313,799   4/1967   Noll _____ 260—160
CHARLES B. PARKER, Primary Examiner
DONALD M. PAPUGA, Assistant Examiner
U.S. Cl. X.R.
8—41, 42, 51, 54, 55; 260—160, 162, 194, 198, 310, 458

PO-1050
(5/69)

UNITED STATES PATENT OFFICE
CERTIFICATE OF CORRECTION

Patent No. 3,462,409                     Dated August 19, 1969

Inventor(s) Fritz Meininger

It is certified that error appears in the above-identified patent and that said Letters Patent are hereby corrected as shown below:

Column 2, line 44, "on" should be -- at --. Column 3, line 14 "atmo" should be -- atom --; line 30, "chloride" should be -- chlorides --; line 66, delete "or"; and line 71, "or" should be -- of --. Column 4, line 21, "1" should be -- 2 --; the left side of the formula should be

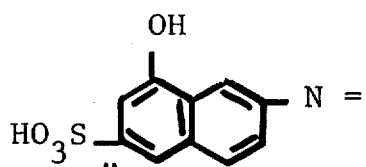

and in the center -- HO—⟊ --; and line 64, "dizanium" should be -- diazonium --. Column 5, top formula, "OCH₃" should be -- OCH₃ -- and "-CH" should be -- -CH₃ --. Column 6, lines 1 and 57, "nitrate" should be -- nitrite --; and in the second formula "HO₂S" should be -- HO₃S --. Column 7, top formula, "HO—⟊" should be -- HO—⟊ --. Column 8, line 32, "⋁⋁" should be --⋁⋁--; and bottom formula, left side, "⋁" should be --⋁--. Column 9, middle formula, right side should be

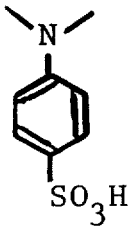

and line 63, after "amino-" insert -- 5- --. Column 10, line 45, should be

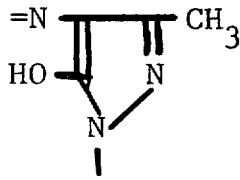

(2)

Column 12, top formula should be

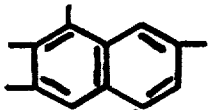

Column 13, line 38 should be "—N="; and line 74 "sulfonphenyl" should be -- sulfophenyl --. Column 15, line 3, "la" should be -- 12 --; line 16 should be --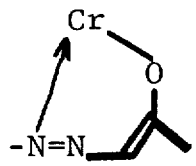--; and bottom formula should be

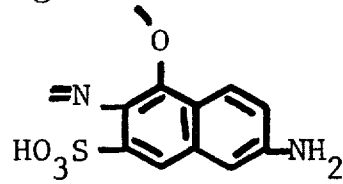

Column 16, lower right of bottom formula should be

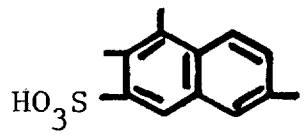

Column 17, lower right of formula should be

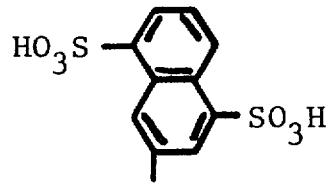

Claim 6, upper left, " -SO$_3$" should be -- -SO$_2$ --; and upper right should be

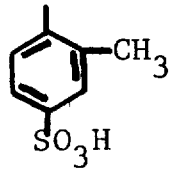

Claim 7, lower left "CH$_3$-CH$_2$-SO$_3$" should be -- CH$_2$-CH$_2$-SO$_2$ --; and lower right should be

SIGNED AND SEALED

MAY 26 1970

(SEAL)
Attest:

Edward M. Fletcher, Jr.

WILLIAM E. SCHUYLER, JR.
Commissioner of Patents